(12) United States Patent
Van Phan et al.

(10) Patent No.: US 11,516,817 B2
(45) Date of Patent: Nov. 29, 2022

(54) RELIABLE OR LOW LATENCY NETWORK MANAGEMENT

(71) Applicant: Nokia Technologies Oy, Espoo (FI)

(72) Inventors: Vinh Van Phan, Oulu (FI); Timo Koskela, Oulu (FI); Samuli Turtinen, Ii (FI); Sami-Jukka Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 78 days.

(21) Appl. No.: 16/892,548

(22) Filed: Jun. 4, 2020

(65) Prior Publication Data

US 2020/0305171 A1    Sep. 24, 2020

Related U.S. Application Data

(63) Continuation of application No. 16/098,458, filed as application No. PCT/FI2016/050302 on May 10, 2016, now abandoned.

(51) Int. Cl.
*H04W 72/08*    (2009.01)
*H04W 48/16*    (2009.01)
(Continued)

(52) U.S. Cl.
CPC ........ *H04W 72/085* (2013.01); *H04W 16/26* (2013.01); *H04W 28/0268* (2013.01); *H04W 48/16* (2013.01); *H04W 52/0216* (2013.01); *H04W 56/001* (2013.01); *H04W 68/02* (2013.01); *H04W 72/0446* (2013.01);
(Continued)

(58) Field of Classification Search
CPC ............... H04W 72/085; H04W 16/26; H04W 28/0268; H04W 48/16
See application file for complete search history.

(56) References Cited

U.S. PATENT DOCUMENTS

| | | | |
|---|---|---|---|
| 6,763,237 B1 * | 7/2004 | Katz | H04B 7/0608 370/329 |
| 2011/0014922 A1 | 1/2011 | Jen | 455/450 |

(Continued)

FOREIGN PATENT DOCUMENTS

| | | |
|---|---|---|
| CN | 104662989 A | 5/2015 |
| CN | 105229934 A | 1/2016 |

(Continued)

OTHER PUBLICATIONS

"Discussion on Study Areas for URLLC in 5G New Radio Interface", Samsung, 3GPP TSG RAN WG2 #93 bis, R2-162227, Apr. 2016, 4 pgs.

*Primary Examiner* — Kevin M Cunningham
(74) *Attorney, Agent, or Firm* — Harrington & Smith

(57) ABSTRACT

According to an example aspect of the present invention, there is provided an apparatus comprising a memory configured to store an indication that the apparatus requires reliable and/or low-latency access to a network, and at least one processing core configured to process an access opportunity pattern, received in the apparatus from a network node, the access opportunity pattern comprising access opportunities provided by a subset of a cluster of cells, detectable by the apparatus, and to trigger for the apparatus reliable and/or low-latency access to the network by selecting from the pattern an access opportunity according to the received access opportunity pattern.

15 Claims, 10 Drawing Sheets

(51) Int. Cl.

| | |
|---|---|
| *H04W 74/00* | (2009.01) |
| *H04W 16/26* | (2009.01) |
| *H04W 28/02* | (2009.01) |
| *H04W 52/02* | (2009.01) |
| *H04W 56/00* | (2009.01) |
| *H04W 68/02* | (2009.01) |
| *H04W 72/04* | (2009.01) |
| *H04W 74/08* | (2009.01) |
| *H04W 48/12* | (2009.01) |

(52) U.S. Cl.
CPC .......... *H04W 74/002* (2013.01); *H04W 48/12* (2013.01); *H04W 74/0833* (2013.01)

(56) References Cited

U.S. PATENT DOCUMENTS

| | | | |
|---|---|---|---|
| 2012/0213108 A1* | 8/2012 | Ji | H04B 7/024 370/252 |
| 2016/0014718 A1* | 1/2016 | Mysore Balasubramanya | H04W 52/0216 455/458 |
| 2016/0165638 A1* | 6/2016 | Ozturk | H04W 68/02 370/329 |
| 2016/0212741 A1 | 7/2016 | Tallikdar | |
| 2017/0311254 A1* | 10/2017 | Ly | H04W 74/0833 |
| 2018/0084560 A1 | 3/2018 | Cho | |
| 2018/0110031 A1 | 4/2018 | Yoshizawa | |
| 2019/0281546 A1* | 9/2019 | Lim | H04W 52/0216 |

FOREIGN PATENT DOCUMENTS

| | | |
|---|---|---|
| WO | WO-2014/190543 A1 | 12/2014 |
| WO | WO-2015/115983 A1 | 8/2015 |

\* cited by examiner

RELIABLE OR LOW LATENCY NETWORK MANAGEMENT

CROSS REFERENCE TO RELATED APPLICATIONS

This is a continuation of copending U.S. patent application Ser. No. 16/098,458, filed Nov. 2, 2018, which is a national stage entry under 35 U.S.C. 371 of International Patent Application No. PCT/FI2016/050302, filed May 10, 2016, the disclosure of which is incorporated by reference herein in its Entirety.

FIELD

The present invention relates to management of a communication network, for example to provide low latency service.

BACKGROUND

Cellular communication involves communication by wireless devices, which may be mobile or stationary devices that need or do not need human interaction, with communication counterparties via cells. Cells may be controlled by base stations or access points, in dependence of the radio access technology, RAT, used.

To establish connectivity via a cell, a wireless device, hereby frequently referred to as user equipment, UE, however, it should be understood that the wireless device is not restricted to any particular type of device, may request access to the network, using an uplink access opportunity. For example, a random access procedure may be employed, wherein the network provides a transmission opportunity for user equipments to transmit toward to network to signal their willingness to engage in communication.

A frequency of access opportunities may determine an average latency incurred in establishing connectivity in the uplink from a user equipment. For example, in case a cell provides a transmission opportunity once per second, a user equipment may need to wait, in case it just missed a transmission opportunity when the need for connectivity was determined, almost one second before the first future transmission opportunity occurs. In case of person-to-person telephone calls, for example, a one-second latency may be considered acceptable. However, in certain applications and use cases, for example machine-to-machine, M2M, communication, a significantly lower latency may be required. For such cases, the network may need to be able to provide more frequent access opportunities of the wireless device to the network.

Also some devices and/or use cases may require more reliable access to the network than other devices and/or use cases. More reliable may mean for example lower error rates than normally accepted. In this case there needs to be a possibility to provide more reliable access to the network.

An example of a communications system where communications with increased reliability and/or decreased latency may be required, is 5G communication system. In a 5G system, the concept of ultrareliable and/or low latency communications, URLLC, also referred to as critical machine-type communication, MCC, is introduced. URLLC implies that reliable and/or instant radio access with low or ultra-low latency needs to be provided and reassured to URLLC users, which may be in an active or inactive state.

A UE may be located within a coverage area of a single cell, however, it can also be located within a coverage area of multiple cells. For example, in 5G system, different frequencies are considered to be used, including very high, mmWave, frequencies. Usage of these frequencies implies small-cell ultra-dense network (UDN) type of deployments, where a UE is likely to be served by a number of local BSs/APs. Also WLAN is another good example for envisioning UDN scenarios in which a user at a certain dense urban location may find a long list of tens of detected private/public APs. The set of cells detectable by a UE may be referred to as a cluster of cells.

SUMMARY OF THE INVENTION

The invention is defined by the features of the independent claims. Some specific embodiments arc defined in the dependent claims.

According to a first aspect of the present invention, there is provided an apparatus comprising a memory configured to store an indication that the apparatus requires reliable and/or low-latency access to a network, and at least one processing core configured to process an access opportunity pattern, received in the apparatus from a network node, the access opportunity pattern comprising access opportunities provided by a subset of a cluster of cells, detectable by the apparatus, and to trigger for the apparatus reliable and/or low-latency access to the network by selecting from the pattern an access opportunity according to the received access opportunity pattern.

Various embodiments of the first aspect may comprise at least one feature from the following bulleted list:
- the access opportunity pattern is provided as a result of coordination among the cells within the cluster of cells
- the access opportunity pattern is provided to the apparatus in response to receiving an indication, by the network, of a demand for reliable and/or low-latency access to a network
- the access opportunity pattern comprises cells which provide sooner uplink access opportunities than cells not participating in the access opportunity pattern and/ or cells which provide more reliable access to the network than the cells not participating in the access opportunity pattern
- the access opportunity is provided by at least one cell of the subset, and the apparatus may select one or more cell providing the access opportunity for transmission
- at least one processing core is configured to trigger the low-latency access to the network by accessing the network via at least one cell providing the first future access opportunity in sequence
- the at least one processing core is configured to trigger the access to the network according to the access opportunity pattern without synchronizing with all members of the subset of cells
- the access opportunity pattern comprises cells with system frames offset in time from system frames of other cells in the subset of cells
- the access opportunity pattern comprises cells which provide more uplink access opportunities per system frame than cells not participating in the access opportunity pattern
- the at least one processing core is configured to cause the indication the apparatus requires access to be provided from the apparatus to the network
- an access opportunity comprises control information, for example synchronization information, transmitted in downlink, DL and an uplink, UL access resource the at least one processing core is further configured to process a first message from the network, the first message instructing the apparatus to remain in an active state with respect to the network, to ensure low-latency access to the network the at least one processing core is further configured to cause transmission of a second message to the network, the second message advising the network of remaining battery power in the apparatus the apparatus is configured to process a paging message from the network addressed collectively to apparatuses which require reliable and/or low latency access, the paging message informing that at least one apparatus requiring reliable and/or low latency access will receive a notification the apparatus is a user equipment.

According to a second aspect of the present invention, there is provided an apparatus comprising at least one processing core, at least one memory including computer program code, the at least one memory and the computer program code being configured to, with the at least one processing core, cause the apparatus at least to configure a subset of a cluster of cells to provide an access opportunity pattern comprising access opportunities to a network, provided by the subset of cells, and cause a message to be transmitted to a user equipment, the message comprising a definition of the access opportunity pattern.

Various embodiments of the second aspect may comprise at least one feature from the following bulleted list:

at least one memory and the computer program code are configured to, with the at least one processing core, cause the apparatus to configure the subset of cells to provide the access opportunity pattern responsive to a determination that a user equipment requiring reliable and/or low-latency access is present in an area served by the subset of cells an access opportunity comprises synchronization information transmitted downlink and an uplink access resource the access opportunity pattern comprises cells with system frames offset in time from system frames of other cells in the subset of cells the access opportunity pattern comprises cells which provide more uplink access opportunities per system frame than cells not participating in the access opportunity pattern the at least one memory and the computer program code are configured to, with the at least one processing core, process a message from the user equipment, the message advising the network of remaining battery power in the user equipment the at least one memory and the computer program code are configured to, with the at least one processing core, configure the user equipment to remain in an active state with respect to the network responsive, at least partly, to the message advising the user equipment has battery power remaining that exceeds a threshold the at least one memory and the computer program code are configured to, with the at least one processing core, cause transmission of a paging message from the network addressed collectively to user equipments which require low latency access, the paging message informing that at least one user equipment requiring low latency access will receive a notification.

According to a third aspect of the present invention, there is provided a method comprising storing an indication the apparatus requires low-latency access to a network, processing, in an apparatus, an access opportunity pattern, received in the apparatus from a network node, the access opportunity pattern comprising access opportunities provided by a subset of cells detectable by the apparatus, and triggering for the apparatus low-latency access to the network by selecting from the pattern a first future access opportunity in sequence.

Various embodiments of the third aspect may comprise at least one feature corresponding to a feature from the preceding bulleted list laid out in connection with the first aspect.

According to a fourth aspect of the present invention, there is provided a method, comprising configuring a subset of cells to provide an access opportunity pattern comprising access opportunities to a network, provided by the subset of cells, and causing a Message to be transmitted to a user equipment, the message comprising a definition of the access opportunity pattern.

Various embodiments of the fourth aspect may comprise at least one feature corresponding to a feature from the preceding bulleted list laid out in connection with the second aspect.

According to a fifth aspect of the present invention, there is provided an apparatus comprising means for storing an indication the apparatus requires low-latency access to a network, means for processing, in an apparatus, an access opportunity pattern, received in the apparatus from a network node, the access opportunity pattern comprising access opportunities provided by a subset of cells detectable by the apparatus, and means for triggering for the apparatus low-latency access to the network by selecting from the pattern a first future access opportunity in sequence.

According to a sixth aspect of the present invention, there is provided an apparatus comprising means for configuring a subset of cells to provide an access opportunity pattern comprising access opportunities to a network, provided by the subset of cells, and means for causing a message to be transmitted to a user equipment, the message comprising a definition of the access opportunity pattern.

According to a seventh aspect of the present invention, there is provided a non-transitory computer readable medium having stored thereon a set of computer readable instructions that, when executed by at least one processor, cause an apparatus to at least store an indication the apparatus requires low-latency access to a network, process, in the apparatus, an access opportunity pattern, received in the apparatus from a network node, the access opportunity pattern comprising access opportunities provided by a subset of cells detectable by the apparatus, and trigger for the apparatus low-latency access to the network by selecting from the pattern a first future access opportunity in sequence.

According to an eighth aspect of the present invention, there is provided a non-transitory computer readable medium having stored thereon a set of computer readable instructions that, when executed by at least one processor, cause an apparatus to at least configure a subset of cells to provide an access opportunity pattern comprising access opportunities to a network, provided by the subset of cells, and cause a message to be transmitted to a user equipment, the message comprising a definition of the access opportunity pattern.

According to a ninth aspect of the present invention, there is provided a computer program configured to cause a method in accordance with at least one of the third and fourth aspects to be performed.

EMBODIMENTS

Figure 1:
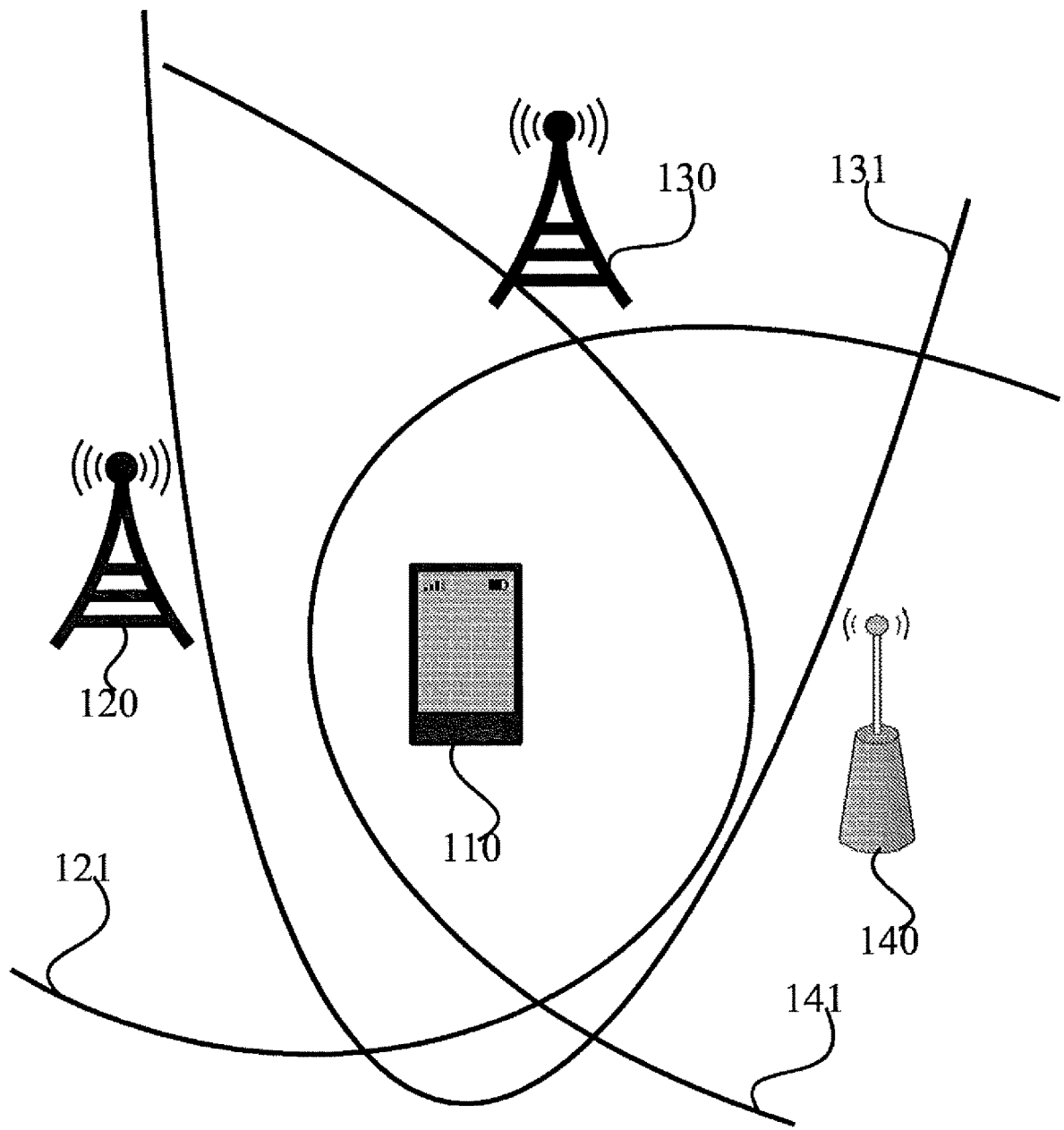
FIG. 1 illustrates an example system in accordance with at least some embodiments of the present invention.

Providing constant and/or default URLLC support in a network may lead to inefficient resource utilization and unnecessarily high signalling overhead. Therefore, support of URLLC does not necessarily need to be provided by all the cells within the cluster. Additionally or alternatively, reliable and/or low latency support may be provided on demand when needed and/or preferable from both UE's and serving network's perspectives.

Some embodiments of the invention relate to providing, by a subset of the cluster of cells, associated with a UE, an URLLC support, while not providing by other cells of the cluster an URLLC support.

Some other embodiments relate to providing, by a subset of the cluster of cells, or alternatively by the whole cluster of cells, associated with a UE, an URLLC suitable configuration on demand. For example, an URLLC suitable configuration may be provided when needed and/or preferable from both UE and serving network perspective.

Some embodiments relate to coordination among the cells within a cluster of cells, associated with UE, to provide an URLLC support. For example, multiple cells can be coordinated to provide more frequent access opportunities, wherein both DL and UL, and UL access is based on control information provided in DL, which may comprise, for example, synchronization information. The coordination among the cells may be UE centric allowing dynamic configuration to provide URLLC support on demand.

The current teachings may be applied to networks operating on licensed or unlicensed bands. Examples may be LTE networks or 5G networks, for example, 5G ultra-dense networks. Other examples may be WLAN networks. Yet other examples may be combinations of different networks.

In some embodiments, the cells, providing an access opportunity pattern for URLLC support may be continued to be used by non-URLLC UE according to the default access pattern. Alternatively, the non-URLLC users may need to access the network from other cells, not participating in providing the access opportunity pattern for URLLC support.

Embodiments of the present invention provide low-latency and/or high reliability access to a user equipment by configuring an access opportunity pattern. Low latency may comprise ultra low latency. In general, low latency may comprise reduced latency, that is, a latency that is shorter than a default latency in the network. The access opportunity pattern comprises access opportunities provided by a cluster of cells. The cluster of cells may be controlled by a cluster of base stations and/or access points. The cluster of cells may comprise first cells operating in accordance with a first radio access technology, RAT, and second cells operating in accordance with a second RAT. The first and second RAT may be same or different RAT. The access opportunity pattern may comprise staggered system frames, such that system frames of all the cells of the cluster of cells don't begin at the same time. The access opportunity pattern may be such that at least part of the cluster of cells provide system frames with an increased number of access opportunities.

FIG. 1 illustrates an example system in accordance with at least some embodiments of the present invention. The system comprises user equipment, UE, 110, which may comprise, for example, a smartphone, laptop computer, tablet computer, smart watch, machine type communication, MTC, device, or other suitable electronic device. The electronic device may need or may not need human interaction. The system further comprises base station 120, base station 130 and access point 140. The expressions "base station" and "access point" refer to similar apparatuses, in detail, apparatuses tasked with controlling a cell. Apparatuses arranged to operate in accordance with a cellular standard, such as wideband code division multiple access, WCDMA, or long term evolution, LTE, or 5G, are often referred to as base stations. On the other hand, apparatuses arranged to operate in accordance with a non-cellular standard, such as wireless local area network, WLAN, or worldwide interoperability for microwave access, WiMAX, may be referred to as access points. Base stations and access points will herein be referred to as base stations for the sake of simplicity.

Base station 120 controls cell 121, the edge of which is schematically illustrated in FIG. 1. Likewise, base station 130 controls cell 131, the edge of which is schematically illustrated in FIG. 1. Access point 140 controls cell 141, the edge of which is schematically illustrated in FIG. 1. The cells may be arranged to operate in accordance with a same radio access technology. Alternatively, the cells may represent cells operating in accordance with different radio access technologies. Specifically, two of the cells, for example cell 121 and 131, may operate in accordance with the same RAT as each other, and cell 141 may operate in accordance with a different RAT. The RATs may comprise cellular and non-cellular RATs.

UE 110 may receive information over a radio link from one or more of the base stations. Information transmitted toward UE 110 is considered to advance in a downlink direction. On the other hand, information transmitted from UE 110 toward one or more base stations is considered to advance in an uplink direction.

UE 110 may require low latency access to the network. One example of a low latency access requirement is a so-called ultra-reliable low-latency communication, URLLC. URLLC is defined in the $3^{rd}$ generation partnership project, 3GPP, document TR 38.915 v. 0.3.0.

URLLC may imply an increased reliability and/or high or ultra-high availability requirement which means that almost instant radio access with low or ultra-low latency needs to be provided and reassured to URLLC users, which may be in either active or inactive states. In the present teachings, the term URLLC is used in referring to 1) low latency, 2) increased reliability, or 3) both low latency and increased reliability. In general, user apparatuses requiring low-latency access may be in an active or inactive state. By active state it is meant that logical channels are assigned to the UE, and by inactive state it is meant that the UE needs to perform an access procedure to obtain access to the network. An example of an access procedure is a random access procedure. An example of an active state is CONNECTED mode in LTE. An example of an inactive state is the IDLE mode of LTE. Furthermore, an active state or in active state may be defined depending on possible discontinuous reception, DRX, operation of the UE, as controlled by the network for the UE in either IDLE mode or CONNECTED mode in LTE for example. In general, in an active state a UE may monitor a paging channel and at least one control channel. In general, in an inactive state a UE may monitor a paging channel without monitoring a control channel.

In a LTE system an inactive IDLE-mode UE, or alternatively a CONNECTED-mode UE in a long DRX, which has a need to access the network may need to detect and select a suitable cell and then use random access channel, RACH, to get initial access to the selected cell in order to establish, or re-establish, a network connection for a required service. Cell detection and selection requires the UE to synchronize to at least one detected local cell and read at least a master information block, MIB, and system information block 1, SIB1, of at least one detected local cell. MIB and SIB1 use a fixed schedule with a periodicity of 40 ms and 80 ms respectively, while the scheduling of other system information, SI, messages may be flexible and indicated by SIM and thus possibly requiring a longer time than 80 ms to acquire. It is clear that LTE is not designed to support URLLC. An active, CONNECTED mode UE on the other hand may acquire MIB and/or SIB continuously and not need to obtain these blocks responsive to a need to initiate connectivity.

Low latency and/or high reliability access may be provided by coordinating among cells and/or beam blocks thereof within a cell cluster associated with a UE, forming one or more so-called high availability patterns, HAPs, adapted to service demands or requirements of an individual UE locally for an efficient support of URLLC. Beam blocks may be present in a beamforming-based radio access system. The cell cluster associated with a UE refers to those local cells the UE may detect. There may be tens of different small cells as well as large cells in a local cell cluster in a dense network environment. A HAP is an example of an access opportunity pattern. A cell cluster thus comprises a plurality of cells.

Figure 9:
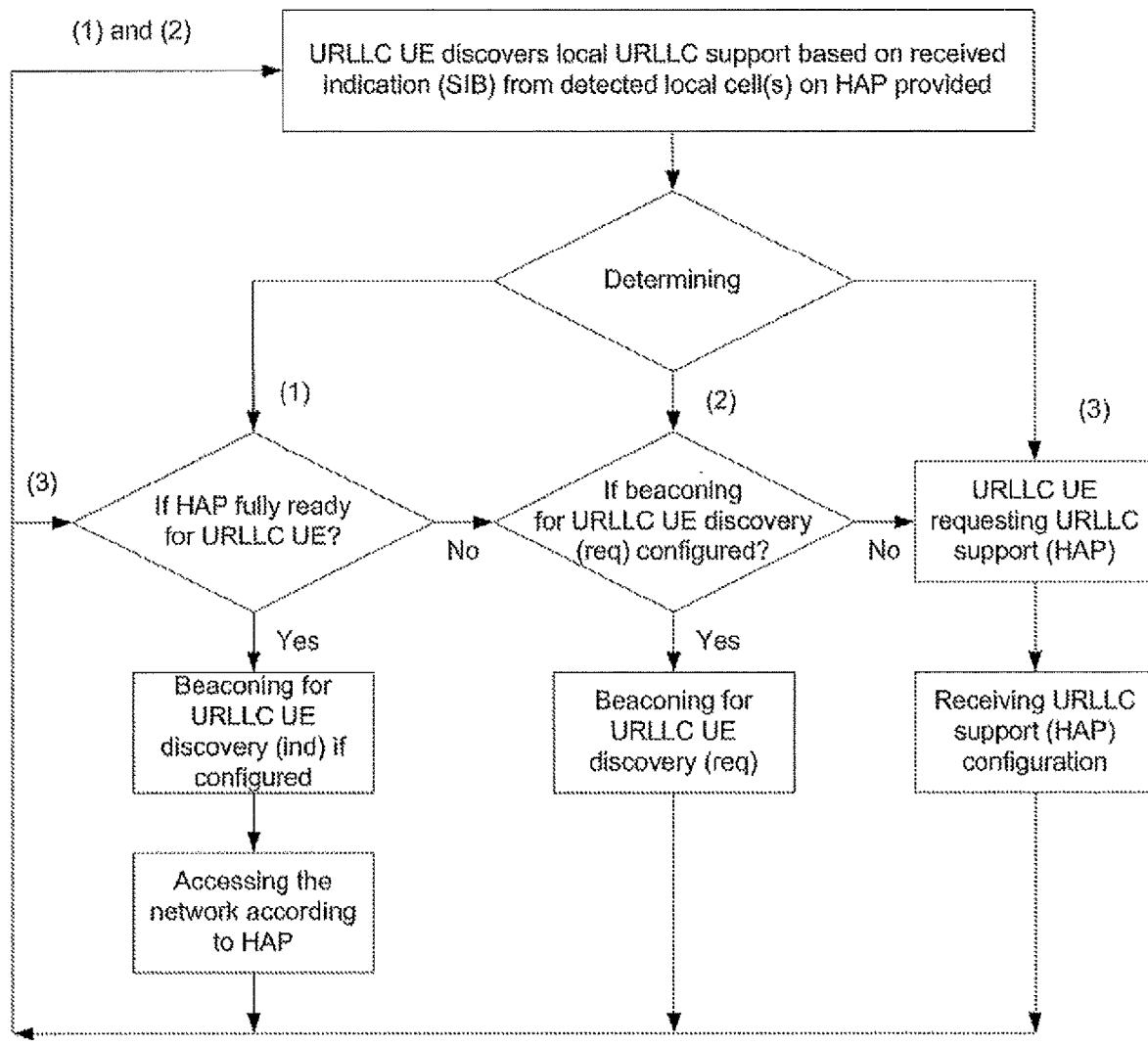
FIG. 9 is a flow graph of a method in accordance with at least some embodiments of the present invention.
Figure 10:
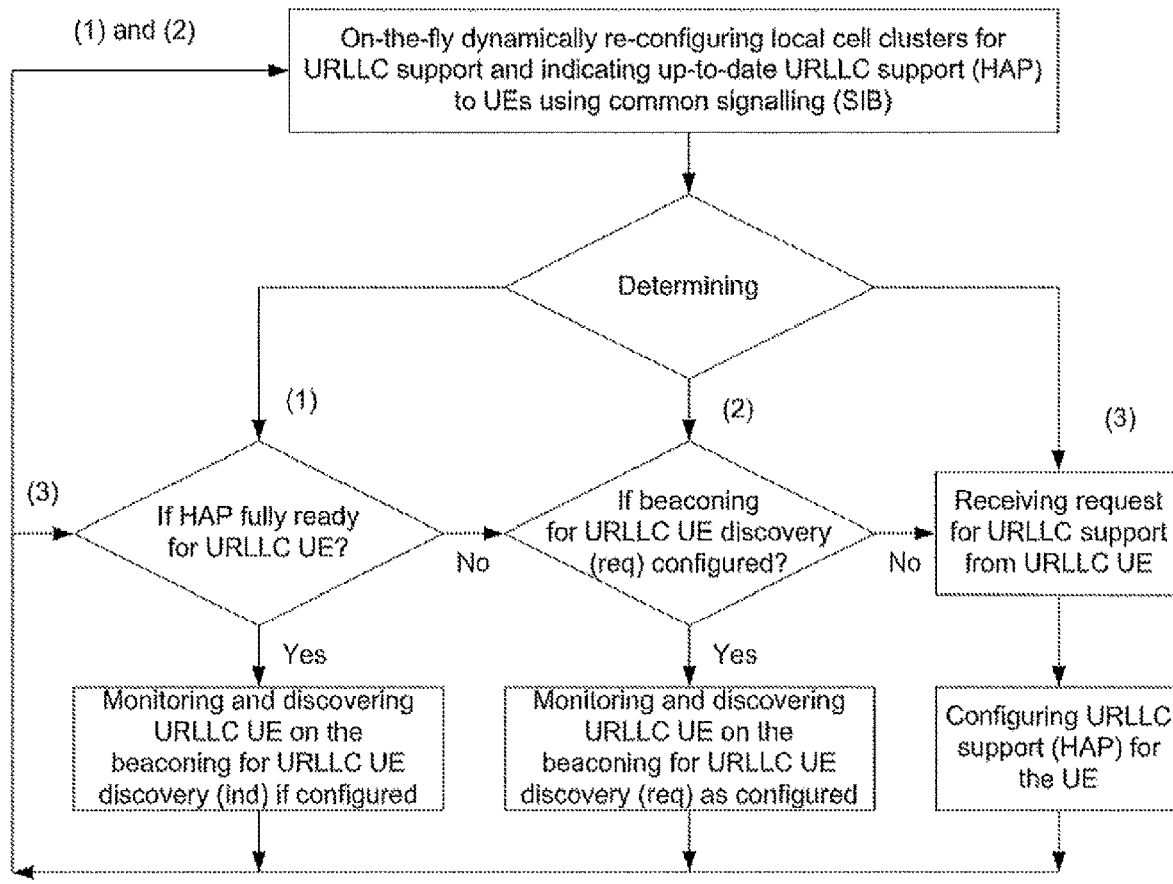
FIG. 10 is a flow graph of a method in accordance with at least some embodiments of the present invention.

For example, a network may initially determine, whether there is in an area a UE present that requires low latency access. The network may determine this by assuming, for example, there is no low-latency access requiring UE unless at least one UE provides an indication that the UE in fact requires low-latency access. Such an indication may be provided by beaconing, for example. In case no UEs require low latency access, cells in the area may be in a default configuration. Examples of embodiments comprising beaconing are illustrated in FIG. 9 and FIG. 10.

Responsive to a determination there is at least one UE requiring highly reliable and/or low latency access in the area, the network may determine whether to configure an access opportunity pattern, so called high availability pattern, HAP. The HAP may be provided by a subset of the cluster of cells, detected by the UE. In case the UE requiring low latency access has remaining battery power exceeding a first threshold, the UE may be configured to remain in an active state with respect to the network. Access to the network is faster from an active state. A further factor that may impact configuring the UE to remain in the active state is whether cells in the area are busy. In case the cells, that is the plurality of cells, or a cluster of cells, serve a number of other devices, configuring the low latency requiring UE to active state may be a more attractive choice than configuring a multi-cell access opportunity pattern.

In some embodiments, if there is a UE in an area requiring low latency access and/or high reliability, the cells within a cluster may coordinate to provide the corresponding HAP. The HAP may be configured so that the soonest transmission opportunity, or opportunities, is provided by one or more cells. In the case if HAP includes more than one cell, the UE may be for example allowed to transmit to more than one cell for diversity or reassuring purposes, for example to assure that the access is successful with at least one cell. Allowing quick access to more than one cell may be one way to assure increased reliability. Another way to increase the reliability may be for example to temporarily restrict the access to the cells within the HAP to only UEs requiring low latency and/or high reliability.

If on the other hand the UE has less than a second threshold level of battery power remaining and/or the cluster of cells are not very busy, the network may configure a multi-cell access opportunity pattern. The first and second thresholds may be the same value, or, alternatively, different values. Remaining in active state consumes more battery resources than being in an inactive state. In some embodiments, the network may configure a multi-cell access opportunity pattern responsive to a UE request for low latency access regardless of battery level or how busy the cells are. Responsive to a determination there is no longer a UE requiring low latency access in the area, the network may be configured to undo a multi-cell access opportunity pattern and cause the cluster of cells to revert to a default configuration that does not support low latency access.

An access opportunity pattern, as provided by a cluster of local cells, may be characterized by a preconfigured pattern of collective or aggregated resource allocations of at least one or two of the following: common cell-specific reference signals, control channels, synchronization signal, SS, broadcast channel, BCH, paging channel, PCH, and RACH. These may be provided collectively across the individual cells of the cluster of cells which are made available to serve a UE. In general, an access opportunity may comprise control information, examples of which are mentioned immediately above. For example, an access opportunity may comprise synchronization information, for example necessary downlink control signalling from at least one cell of the cluster of cells, and at least one uplink transmission resource provided to enable the UE to send an initial access request to at least one cell of the cluster of cells. A synchronization signal, SS, is an example of a basic element of the synchronization information. There may be other control elements of the synchronization information. In prior art solutions, HAP has been provided by an individual selectable cell with channel resources thereof on per-cell basis, which may be semi-static and common to all UEs regardless of service demands or requirements.

In multi-cell access opportunity patterns, different subsets in a cluster of cells may be coordinated, for example by configuring system frame time shifting or offsetting between the subsets so that cells in the cluster of cells may collectively provide low latency access, while individual cells may be arranged to not provide more frequent access opportunities by themselves. Cells participating in the access opportunity pattern may operate on different carriers. UE without a low-latency requirement may be served with small cells in either one of the subsets, for example.

In some embodiments, in order to facilitate downlink paging for low latency requiring UEs in an inactive state, a paging mechanism directed to low latency UEs may be implemented, for example as a part of the provided access opportunity pattern, in addition to normal paging procedures. For example, such a page may be issued to all low latency requiring UEs to warn them in advance of a downlink page incoming to at least one of them. Responsive to this page, the low latency UEs may monitor the normal downlink paging channels in the configured access opportunity pattern. In some embodiments, all cells participating in the access opportunity pattern transmit this page. The page may be provided, for example, as part of an access opportunity, for example in a downlink control part comprised in the access opportunity.

Herein, where the network determines, decides or configures something, it may in general refer to a base station performing this action, or, alternatively or additionally, a core network node performing this action.

Figure 2A:
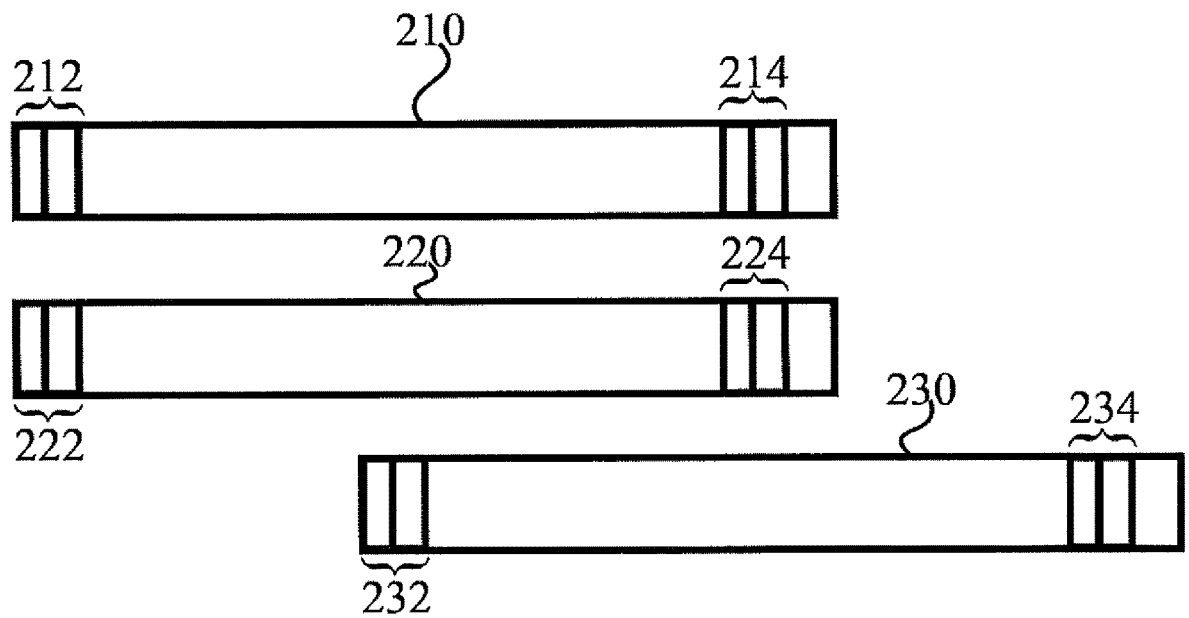
FIGS. 2A and 2B illustrates examples of access opportunity patterns.
Figure 2B:
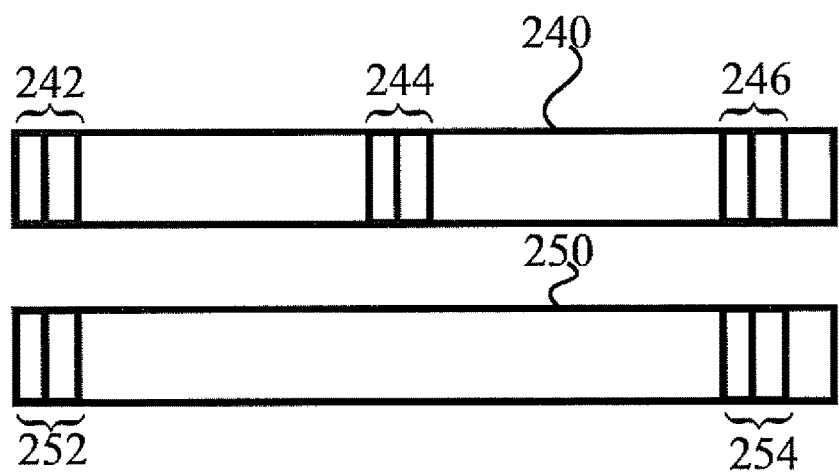

FIGS. 2A and 2B illustrate examples of access opportunity patterns. Turning first to FIG. 2A, system frame 210 comprises two uplink access opportunities 212 and 214, disposed at the beginning and end of system frame 210, respectively. Each uplink access opportunity in FIGS. 2A and 2B may comprise a combination of a downlink control part and an uplink access part. The downlink control part may comprise synchronization information, for example. The uplink access part may comprise an uplink transmission resource, for example. A system frame length may be 20 milliseconds, ms, for example. Therefore, uplink access opportunities in the system frame structure of system frame 210 take place every 20 ms.

System frames 220 and 230 are offset with respect to each other. A cell transmitting system frame 220 and a cell transmitting system frame 230 may be seen as a cluster of cells, divided into a first subset comprising the cell transmitting system frame 220 and a second subset comprising the cell transmitting system frame 230. System frame 220 comprises uplink access opportunities 222 and 224, separated from each other by 20 ms, and system frame 230 comprises uplink access opportunities 232 and 234, separated from each other by 20 ms. Due to the offset between system frame 220 and system frame 230, the cluster of cells that transmit system frame 220 and system frame 230 collectively provides uplink access opportunities every 10 ms, since uplink access opportunity 232 occurs 10 ms after uplink access opportunity 222. Similarly, 10 ms separates uplink access opportunity 224 from uplink access opportunity 232, and uplink access opportunity 234 from uplink access opportunity 224. Thus the cluster of cells transmitting system frame 220 and system frame 230 collectively provides an access opportunity pattern consistent with a lower-latency access requirement than that provided by system frame 210.

Considering then FIG. 2B, it comprises system frames 240 and 250. System frame 250 may essentially resemble a system frame in FIG. 2A, providing uplink access opportunities 252 ad 254, with a 20 ms interval. System frame 240, on the other hand, has been modified to present three uplink access opportunities, namely opportunities 242, 244 and 246, such that these uplink access opportunities take place at a 10 ms interval. As in FIG. 2A, also in FIG. 2B a low-latency access opportunity pattern is provided, since uplink access opportunities take place every 10 ms, that is, in general more frequently than in system frame 210.

Although two distinct embodiments are herein described with reference to FIG. 2A and FIG. 2B, the two techniques may be combined, for example by shifting system frame 250 forward in time, so that uplink access opportunity 252 occurs between opportunities 242 and 244. As a further example, system frame 250 may be modified to present three uplink access opportunities, like system frame 240, and system frame 250 may be shifted 5 ms with respect to system frame 240, to provide uplink access opportunities with a 5 ms periodicity. Therefore, in general, configuring an access opportunity pattern may comprise shifting system frames and/or adding access opportunities to system frames, the system frames being system frames of a cluster of cells.

To obtain access to the network, a UE can, once a need for access is determined in the UE, select from the pattern an access opportunity according to the received access opportunity pattern. For example, this may comprise that a first future access opportunity in sequence is selected. By this it is meant the UE first determines which access opportunity will occur next, after the determination that access is needed, and then the UE will obtain the access using this access opportunity. The determination of the next access opportunity may comprise determining, using the access opportunity pattern, which cell will provide the next access opportunity.

Figure 3:
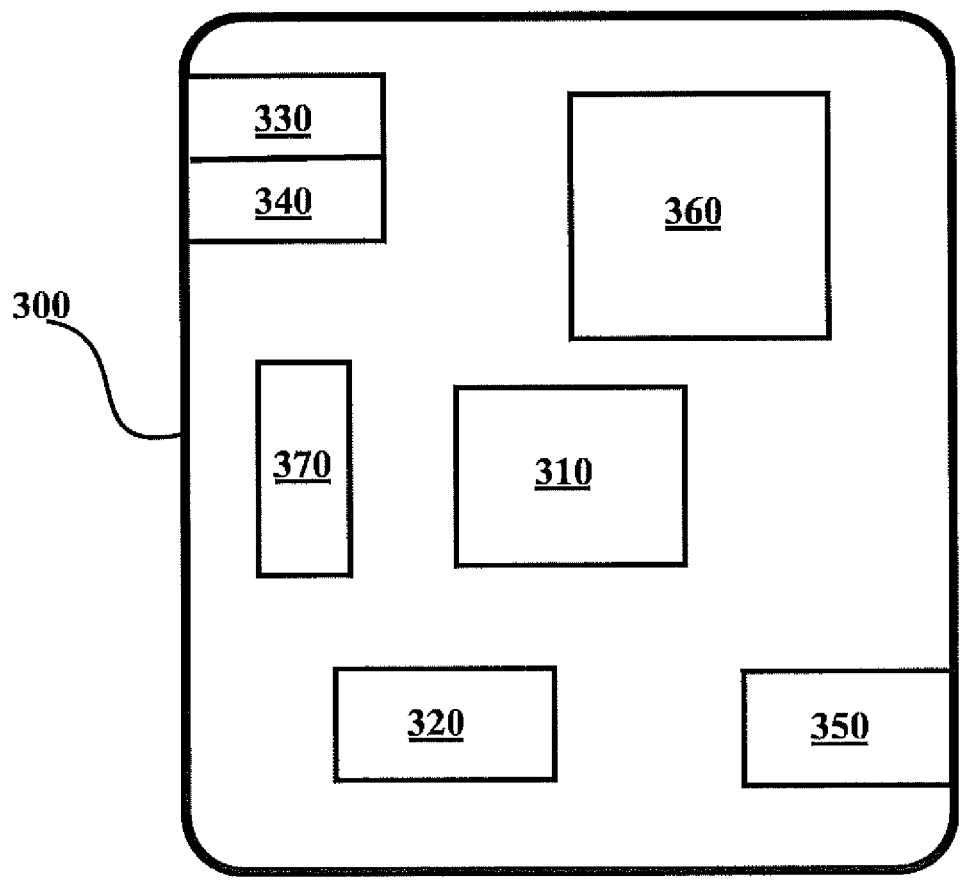
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as UE 110 or, in applicable parts, a base station or access point of FIG. 1, or a network controller node. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NEC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to express a requirement for low-latency access to a network.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
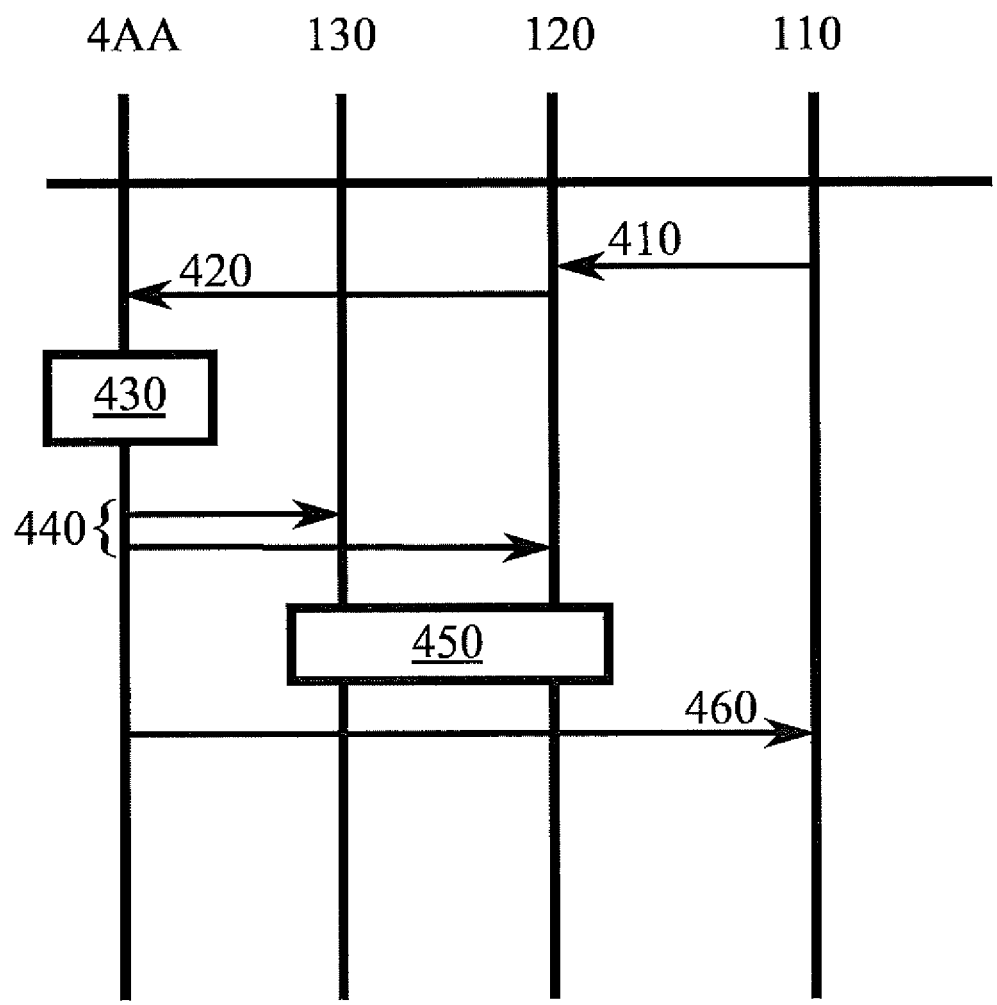
FIG. 4 illustrates signalling in accordance with at least some embodiments of the present invention.

FIG. 4 illustrates signalling in accordance with at least some embodiments of the present invention. On the vertical axes are disposed, from the left to the right, network control function 4AA, base station 130, base station 120, and finally UE 110 of FIG. 1, Time advances from the top toward the bottom. While control function 4AA is illustrated as a distinct entity, in some embodiments it may be comprised in a same physical apparatus as base station 120 or base station 130. In other embodiments, control entity 4AA may be comprised in a radio access network controller device, or in a core network device, for example.

In phase 410, UE 110 indicates to the network that it requires low-latency access. This may take place by transmitting a message to such effect to base station 120, which forwards, phase 420, the indication to control function 4AA.

In phase 430, control function 4AA decides on configuring a cluster of cells available to UE 110, to provide a multi-cell access opportunity pattern to UE 110. In the example case of FIG. 4, control function 4AA decides to configure the cells to provide the multi-cell access opportunity pattern to UE 110. The configuring takes place in phase 440, wherein control function 4AA provides configuration information to the cluster of cells. In FIG. 4, the cluster of cells comprises at least one cell controlled by base station 120 and at least one cell controlled by base station 130.

In phase 450, base station 120 and base station 130 configure the cluster of cells to provide the low latency access opportunity pattern to UE 110. Optionally, the base stations may report to control function 4AA once the access opportunity pattern has been taken into use in the cluster of cells. Finally, in phase 460, control function 4AA informs UE 110 of the low latency access opportunity pattern, thus enabling low latency access in the uplink to UE 110. The phase 460 may involve individual base station 120 and base station 130 providing corresponding dedicated or common control information on opportunity pattern to UE 110, for example.

Figure 5:
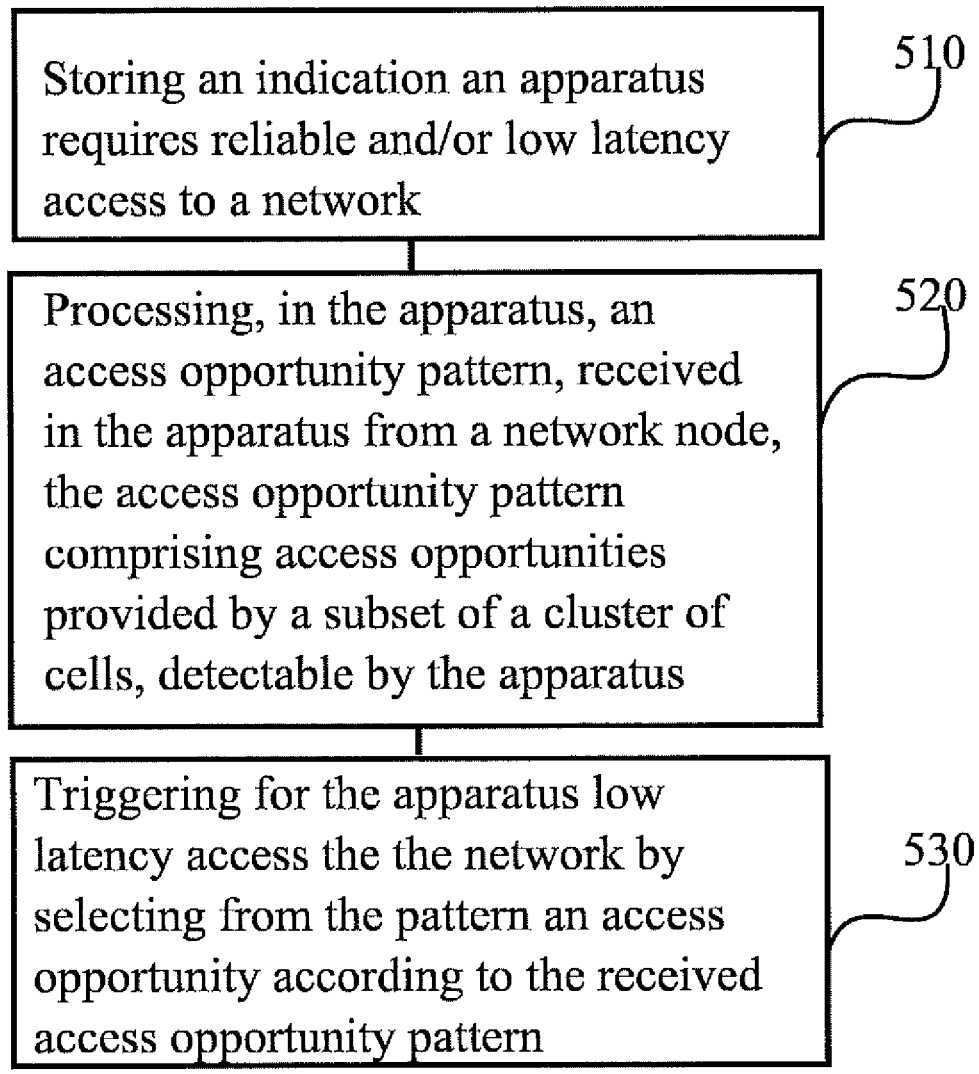
FIG. 5 is a flow graph of a method in accordance with at least some embodiments of the present invention.

FIG. 5 is a flow graph of a method in accordance with at least some embodiments of the present invention. The phases of the illustrated method may be performed in UE 110, or in a control device configured to control the functioning thereof, when implanted therein.

Phase 510 comprises storing an indication that an apparatus requires reliable and/or low-latency access to a network. Phase 520 comprises processing, in the apparatus, an access opportunity pattern, received in the apparatus from a network node, the access opportunity pattern comprising access opportunities provided by a subset of a cluster of cells, detectable by the apparatus. Receiving the access opportunity pattern in the apparatus may comprise receiving information characterizing the access opportunity pattern. Finally, phase 530 comprises triggering for the apparatus reliable and/or low-latency access to the network by selecting from the pattern an access opportunity according to the received access opportunity pattern.

Figure 6:
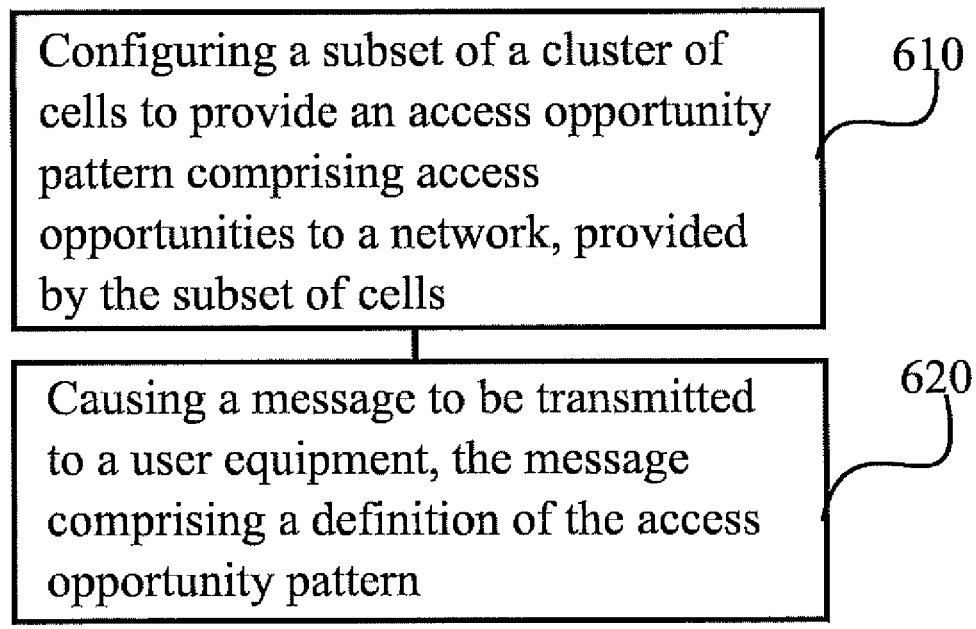
FIG. 6 is a flow graph of a method in accordance with at least some embodiments of the present invention.

FIG. 6 is a flow graph of a method in accordance with at least some embodiments of the present invention. The phases of the illustrated method may be performed in a network control function, for example, or in a control device configured to control the functioning thereof, when implanted therein.

Phase 610 comprises configuring a subset of a cluster of cells to provide an access opportunity pattern comprising access opportunities to a network, the access opportunities in the pattern being provided by the subset of cells. Phase 620 comprises causing a message to be transmitted to a user equipment, the message comprising a definition of the access opportunity pattern.

In the following, certain non-limiting examples in accordance with principles of the present invention will be laid out.

This invention proposes a method for coordinating among small cells (and/or beam blocks thereof in a beamforming mmW system for examples) within a cell cluster associated with a UE in a UDN, forming one or more assess opportunity patterns or HAPs adapted to service demands or requirements of individual UE locally for an efficient support of URLLC. The cell cluster associated with a UE refers to those local cells UE may detect, wherein cells in the cluster are not limited to a same RAT. There can be tens of different small cells in a local cell cluster in a UDN environment. The method includes proposals for UE behaviours and signalling procedures adapted to discovered HAP and support of URLLC as provided by the serving network.

The invention aims to enable the following efficient adaptive operations for examples:

If there is no such a URLLC-demanding UE present in the local service area, cell configuration over the local service area may follow the approach provisioned and used to support MBB and non-URLLC MTC services as in current LTE networks for example.

If there is such a URLLC demanding UE in the local service area then the following possibilities may be considered.

If the UE has sufficient enough battery power and the local serving cells are busy enough in serving other users, the UE may be configured to stay in some active mode or state even if the UE is not actually having or conducting URLLC If the UE has insufficient remaining battery power and/or the local serving cells are less occupied then the UE may be allowed to go into an inactive mode or state while the local serving cells, forming a UE centric cell cluster, are coordinated so as to provide the UE with suitable HAP (increased frequency of available access occasions—including BCH/PCH/RACH related occasions—as aggregated over the cell cluster, instead of per individual cell as in prior solutions).

HAP, as provided by a subset of local cells within the cell cluster, may be characterized by some preconfigured pattern of collective or aggregated resource allocation of at least common cell-specific reference signals and control channels (such like SS, BCH, PCH and RACH) across the individual cells of the subset which are made available to serve a UE (recognizable by UE).

In some exemplary embodiments, a HAP for URLLC may be provided via selected local cells from different subsets of the cell cluster which may provide HAP with coordination of; e.g., preconfigured system-frame level SFN shifting or offsetting between the subsets of cells so that those selected local cells collectively may be suitable for URLLC. UE without URLLC demand may be served with small cells in either one of the subsets. This invention provides a URLLC opportunity to a UE without a need of per-cell staggered resource configuration.

Figure 7:
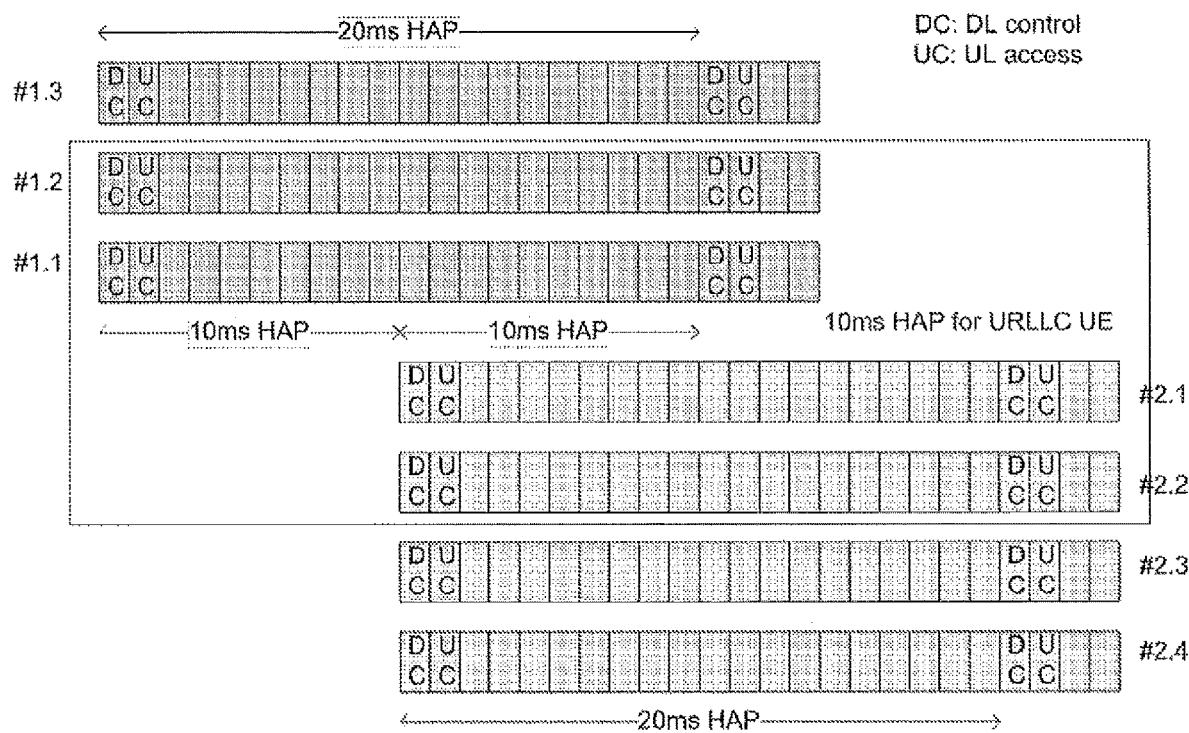
FIGS. 7 and 8 illustrate examples of access opportunity patterns.
Figure 8:
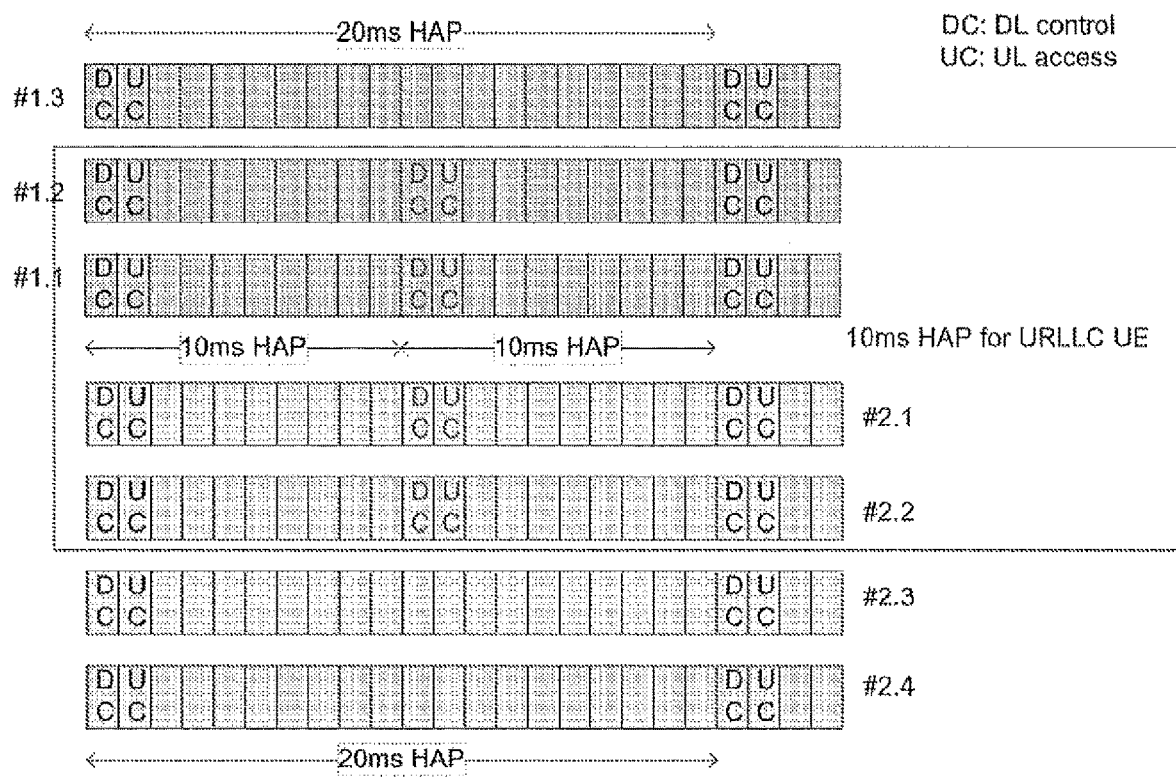

FIG. 7 and FIG. 8, further to FIG. 2A and FIG. 2B, illustrate some instances or possibilities of selecting and configuring HAP for URLLC UE, for example on the fly. FIG. 7 shows the possibility using a preconfigured system frame timing offset/shifting between subset 1 and subset 2 for coordinating between local cells within the cell cluster to provide suitable HAP for URLLLC UE. FIG. 8 shows the possibility using dynamic cell selection and reconfiguration, adding more UL/DL control occasions, to configure suitable HAP on the fly in a fully time aligned cell cluster for URLLC UE. DL Control, DC, part refers to slot(s) or frames within a super-frame of 20 ms where DL common control information, for example. related to SYNCH/BCH/PCH is provided; and UL Control, UC, part refers to slot(s) or frames within a super-frame of 20 ms where UE may has resource allocation, for example related to RACH/UL beaconing/UL requesting for initial access. The pair of consecutive DC and UC provides an access opportunity for UE. FIG. 7 and FIG. 8 show that an access opportunity may be provided by more than one cell. That is, UE may perform the initial access procedure with sending parallel access requests to more than one cell in one access opportunity which is provided by more than one cell. This, by exploring diversity offered by a subset of cells in order to assure success of the initial access at first access opportunity, helps ensuring high reliability in addition to low latency.

For adaptive on-demand UE centric networking aspect, one embodiment is based on the idea that HAP for URLLC is provided only when there is UE which has demand for URLLC, but not necessarily in need to conduct URLLC at the moment, residing locally. This is provided with different optimized options in dependence of whether the serving network prefers to keep UE in an active state or in a more power-saving inactive state with smart control or enforcement. Note that even when provided HAP, as recognized by UE being in inactive state, is not suitable for URLLC the network may still be able to support URLLC for UE by keeping it in active state.

To put it plain or simple for an example, when the local cell cluster identifies that there is a UE with URLLC demand located within the corresponding cluster, a subset of cells which are able to provide URLLC are coordinated to form HAP1 that will provide the URLLC possibility, to one or more UEs. In case there are no UEs within the local cell cluster that requires URLLC, then there is no need to form that HAP1, but for example all cells of the cluster can be configured with HAP2.

Thus, an embodiment may be formulated as follows, for example:

The provided method for efficient support of URLLC comprises:

Step 1: Determining at the network side if URLLC support is needed at a cluster of local small cells (i.e., local cell cluster) in a UDN by discovering or by being informed about the presence or request of UE demanding for URLLC locally;

Step 2: Selecting and re-configuring a subset of cells within the local cell cluster to form a predefined HAP, coordinated and provided by the selected small cells, for supporting URLLC UE;

Step 3: Indicating the configured HAP to URLLC UE. Further features may include, for example:

Step 4: The network may configure individual cells in the selected subset in Step 2 with additional UL and DL control occasions for URLLC UE to use for selecting and accessing any cell of the selected subset whenever URLLC UE has a need for that.

Step 5: Determining if URLLC support is provided for UE in an inactive state or not. Note that the support of UE in "inactive state" presents more challenges in terms of having resource arrangements ready for UE whenever it needs to wake up from inactive, e.g., due to incoming call or network initiated communication or any UE initiated communication.

If yes then configuring at least a first subset of the local small cells within the cell cluster with a first configuration according to a first HAP and at least a second subset of the local small cells within the cell cluster with a second configuration according to a second HAP:

The first configuration and the second configuration each follows a preconfigured system-frame level timing and SFN numbering but with a predefined coordination of e.g. SFN shifting or offsetting between the first configuration and the second configuration;

The first HAP may be the same as the second HAP;

The first subset and the second subset of the cell cluster may operate in same carrier(s) or different carrier(s) or, that is, with exclusive or shared carrier(s);

UE having URLLC demand and being in inactive state is configured to recognize each configured subsets and make use of at least one cell in the first subset and one cell in the second subset;

UE having no URLLC demand is configured to be served by small cells either in the first subset or in the second subset or any of local small cells).

Else triggering UE having URLLC to get in and be kept in a connected or active state. That is, URLLC UE even when it does not need to conduct any URLLC communications need to be kept in active all the time. Then, a suitable HAP may still needs to be configured and provided to UE, at least in case of loss of synchronization or radio-link failure or so.

The network may configure UE with the configured HAP using dedicated signalling.

In one embodiment, local cells which support URLLC may be configured to indicate to relevant UE the support of URLLC either implicitly via URLLC specific HAP and/or explicit indication. This indication is used by relevant UE to determine whether it is allowed to stay in a specified inactive mode or state or to be enforced to get into and kept staying in a specified active mode or state as long as UE may demand URLLC.

In one embodiment, in order to facilitate the possibility to discover URLLC demanding UE presence in local service area of UDN and provide suitable and preferable HAP for UE accordingly:

URLLC demanding UE may be assigned with a designated beacon signal(s) for announcing its presence so as to be discovered at the local network environment when not conducting such the URLLC services:

The designated beacon signal may be dedicated to individual UE or common to a group of UEs (there may be different levels or degrees of such the ultra-requirements)

The beaconing of such individual UE (how often, what kind of signal, what kind of power range, etc.) may indicate corresponding capability and condition of the UE:

How fast UE may be able to perform e.g. cell selection and selection (state transition to be active and ready)

How sufficient mobile battery power the UE has (more or less frequent beaconing, higher or lower power range, etc.)

The beaconing may be pre-configured as semi-static and specific for a certain service area (not cell specific in small-cell UDN)

The beaconing signal(s) may be adapted to whether the current HAP is fully ready for URLLC UE or not and, therefore, triggering possible on-the-fly reconfiguration of HAP. For examples, in case the current HAP is fully ready to support URLLC and the network side discovers that there is no URLLC UE staying around based on monitoring the configured corresponding beacon signal for discovery (referred to as indicating beacon) then the network side may reconfigure the current HAP for more sufficient operation (not fully ready for URLLC). In case the current HAP is not fully ready to support URLLC and the network side discovers that there is some URLLC UE coming based on monitoring the configured corresponding beacon signal for discovery, referred to as requesting beacon, then the network side may reconfigure the current HAP to be fully ready to support URLLC UE.

The local serving network therefore may discover URLLC demanding UE directly (by small-cell APs monitoring URLLC beaconing) or in directly via e.g. indication or report from device(s) which are configured by the local serving network to discover such UE. Note that URLLC demanding UE may also be configured to indicate its presence to the local serving network using partial or full radio access. The former refers to the option in which URLLC demanding UE may use a dedicated RACH preamble as a special case of the above dedicated beaconing. The latter refers to the option in which URLLC demanding UE gets more extended access to the local serving networking to indicate its presence. Then:

The local serving network, comprising local APs or NBs, may coordinate among local co-located or neighbouring cells to form a preferable HAP, as configured, to serve UE, making sure that there is always at least one local NB to be selectable for the UE at any time instance the UE need to conduct URLLC, in an efficient way, avoiding the situation that each and every individual local cell needs to be reconfigured with increased frequency of, e.g., BCH/PCH/RACH related control and allocation.

Local cells forming local HAP should, in these embodiments, also synchronize or align system- and cell-specific configuration information so that UE does not have to fetch and update system information every time and that dynamic cell specific info is kept as minimum to minimized acquisition of that and fasten initial access.

Depending on capability or capacity of discovered UE as well as the serving local network, which may be dynamic or variable, the local serving network may indicate to trigger if the UE needs to get into a specified active mode/state or not even when not conducting URLLC. For examples:

UE which is not capable of reselecting a cell fast enough should be kept in suitable active mode/state;

UE which has the most demanding level of URLLC requirements should be kept in suitable active mode/state;

UE which the network may not be able to react fast enough from an inactive mode/state (due to high mobility of UE or high network load) should be kept in suitable active mode/state.

FIG. 9 and FIG. 10 illustrate the operation described above for the UE side and the network side, respectively.

In one embodiment, in order to facilitate energy-efficient fast and reliable DL paging or notification for URLLC UEs in inactive state or mode, it is proposed that, in addition to, e.g., paging mechanism and signalling used for more delay tolerable (non-URLLC) UEs, a DL reference signal (RS) is introduced for local APs to warn all URLLC UEs in inactive state or mode of upcoming DL paging or notification for at least one of those URLLC UEs. The reason behind this paging signal or message is that, as URLLC UE is expected to receive and answer any incoming page for it within the low latency requirement, UE may need to monitor for incoming page very frequently. Thus, by introducing the URLLC specific paging signal for URLLC UE to monitor as frequently as needed, instead of having UE to monitor more processing-consuming regular paging channel, power consumption or energy efficiency of UE may be significantly enhanced. Let us refer to the introduced DL RS as URLLC-DL-RS which may be considered as an on-the-fly configurable part of corresponding HAP.

- URLLC-DL-RS may be unique and common to individual groups of URLLC UEs or individual HAPs (as there may be different levels or degrees of such the ultra-requirements) with preconfigured format, periodicity and channel resource.
- URLLC-DL-RS may be sent by all local APs of at least a local cluster according to HAP and URLLC UEs may monitor URLLC-DL-RS from more than one local AP at once. For example, URLLC-DL-RS may be sent right after DL synchronization signal(s) in every system frame of 10 ms. This is to ensure URLLC UEs are notified quickly and reliably so that URLLC UEs may further decide to monitor for actual paging and allocation scheduled for identified individual(s) from one or more AP according to HAP.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing communication networks.

ACRONYMS LIST

BCH broadcast channel
HAP high availability patterns
LTE long term evolution
PCH paging channel
RACH random access channel
RAT radio access technology
SS synchronization signal
UE user equipment
URLLC ultra-reliable and/or low latency
WCDMA wideband code division multiple access
WLAN wireless local area network
WiMAX worldwide interoperability for microwave access

| REFERENCE SIGNS LIST | |
| --- | --- |
| 110 | user equipment, UE |
| 120, 130 | base stations |
| 140 | access point |
| 121, 131, 141 | cells |
| 210, 220, 230, 240, 250 | system frames |

-continued

REFERENCE SIGNS LIST

| | |
|---|---|
| 212, 214, 222, 224, 232, 234, 242, 244, 246, 252, 254 | uplink access opportunities |
| 310-370 | structure of the apparatus of FIG. 3 |
| 410-460 | phases of the method of FIG. 4 |
| 510-530 | phases of the method of FIG. 5 |
| 610-620 | phases of the method of FIG. 6 |

The invention claimed is:

1. A method, comprising:
storing by user equipment of a communication network an indication that the user equipment requires at least one of reliable or low-latency access to a network;
receiving from a network node of the communication network, an access opportunity pattern, the access opportunity pattern comprising access opportunities provided by a subset of a cluster of cells detectable by the user equipment;
receiving during an inactive state, a downlink reference signal from a cell as a part of the received access opportunity pattern addressed to apparatuses which require at least one of reliable or low-latency access, the reference signal informing that at least one user equipment requiring the at least one of reliable or low-latency access will receive a downlink page;
monitoring, based on the informing, a downlink paging channel in the access opportunity pattern for the downlink page; and
triggering at least one of reliable or low-latency access to the network by selecting an access opportunity according to the received access opportunity pattern.

2. The method according to claim 1, wherein based on the informing the apparatus does not monitor paging occasions that are determined to be at least one of not reliable or not energy access specific.

3. The method according to claim 1, wherein the downlink reference signal is specific for at least one Ultra-Reliable Low-Latency Communication capable user equipment.

4. The method according to claim 3, wherein the downlink reference signal is received from at least one access point of more than one access point identified by the user equipment.

5. The method according to claim 4, wherein the at least one access point is identified by the user equipment based on an availability pattern of the more than one access point.

6. The method according to claim 1, wherein the downlink reference signal is received after a downlink synchronization signal.

7. The method according to claim 6, wherein the downlink reference signal is received after at least one downlink synchronization signal in every system frame of 10 ms.

8. The method according to claim 1, wherein the triggering is based on selecting an access opportunity according to a received access opportunity pattern.

9. An apparatus, comprising:
at least one processor; and
at least one non-transitory memory including computer program code, wherein the at least one non-transitory memory including the computer program code is configured, with the at least one processor, to cause the apparatus to:
store by a user equipment of a communication network an indication that the user equipment requires at least one of reliable or low-latency access to a networks;
receive from a network node of the communication network, an access opportunity pattern, the access opportunity pattern comprising access opportunities provided by a subset of a cluster of cells detectable by the user equipment;
receive during an inactive state, a downlink reference signal from a cell as a part of the received access opportunity pattern addressed to apparatuses which require at least one of reliable or low-latency access, the reference signal informing that at least one user equipment requiring the at least one of reliable or low-latency access will receive a downlink page;
monitor, based on the informing, a downlink paging channel in the access opportunity pattern for the downlink page; and
trigger at least one of reliable or low-latency access to the network by selecting an access opportunity according to the received access opportunity pattern.

10. The apparatus according to claim 9, wherein based on the informing the apparatus does not monitor paging occasions that are determined to be at least one of not reliable or not energy access specific.

11. The apparatus according to claim 9, wherein the downlink reference signal is specific for at least one Ultra-Reliable Low-Latency Communication capable user equipment.

12. The apparatus according to claim 11, wherein the downlink reference signal is received from at least one access point of more than one access point identified by the apparatus.

13. The apparatus according to claim 12, wherein the at least one access point is identified by the apparatus based on an availability pattern of the more than one access point.

14. The apparatus according to claim 9, wherein the downlink reference signal is received after a downlink synchronization signal.

15. The apparatus according to claim 14, wherein the downlink reference signal is received after at least one downlink synchronization signal in every system frame of 10 ms.

* * * * *